(12) United States Patent
Saito et al.

(10) Patent No.: US 12,312,247 B2
(45) Date of Patent: May 27, 2025

(54) PRODUCTION METHOD FOR HIGH-PURITY HYDROGEN CHLORIDE GAS

(71) Applicant: TOKUYAMA CORPORATION, Yamaguchi (JP)

(72) Inventors: Akihiro Saito, Yamaguchi (JP); Dai Tsunoda, Yamaguchi (JP); Masayuki Moriwaki, Yamaguchi (JP)

(73) Assignee: TOKUYAMA CORPORATION, Yamaguchi (JP)

(*) Notice: Subject to any disclaimer, the term of this patent is extended or adjusted under 35 U.S.C. 154(b) by 524 days.

(21) Appl. No.: 17/780,311

(22) PCT Filed: Dec. 3, 2020

(86) PCT No.: PCT/JP2020/045094
§ 371 (c)(1),
(2) Date: May 26, 2022

(87) PCT Pub. No.: WO2021/117610
PCT Pub. Date: Jun. 17, 2021

(65) Prior Publication Data
US 2022/0411265 A1   Dec. 29, 2022

(30) Foreign Application Priority Data

Dec. 9, 2019   (JP) .................................. 2019-222188

(51) Int. Cl.
*C01B 7/07* (2006.01)
*B01D 3/42* (2006.01)
(Continued)

(52) U.S. Cl.
CPC .............. *C01B 7/0737* (2013.01); *B01D 3/42* (2013.01); *B01D 19/0005* (2013.01);
(Continued)

(58) Field of Classification Search
CPC ................ C01B 7/0737; C01B 7/0712; C01B 2210/0009; C01B 2210/0028;
(Continued)

(56) References Cited

U.S. PATENT DOCUMENTS 4,225,520 A * 9/1980 Riedl ...................... C07C 17/25
570/226
2001/0038818 A1* 11/2001 Kumoi .................... C07C 17/25
570/224

FOREIGN PATENT DOCUMENTS

JP        S43-030171 B    12/1968
JP        S49-034317 B    9/1974
(Continued)

OTHER PUBLICATIONS

ISR issued in International Patent Application No. PCT/JP2020/045094, Feb. 22, 2021, translation.

*Primary Examiner* — Anthony J Zimmer
*Assistant Examiner* — Starfari Teshawn McClain
(74) *Attorney, Agent, or Firm* — GREENBLUM & BERNSTEIN, P.L.C.

(57) ABSTRACT

A method for producing a high-purity hydrogen chloride gas comprises performing a purification process that includes the steps 1) to 3) below on a byproduct hydrogen chloride gas:

1) a crude hydrochloric acid generation step of allowing water to absorb the byproduct hydrogen chloride gas;
2) a volatile organic impurity-removed hydrochloric acid generation step of bringing the crude hydrochloric acid obtained in the step 1) into contact with an inert gas at a liquid temperature of 20 to 45° C. to dissipate volatile organic impurities; and
3) a high-purity hydrogen chloride gas generation step of supplying the volatile organic impurity-removed hydrochloric acid obtained in the step 2) to a distillation
(Continued)

column and performing distillation under conditions of a column bottom temperature of higher than 60° C. and 108° C. or lower and a column top temperature of 60° C. or lower to distill out a high-purity hydrogen chloride gas.

12 Claims, 1 Drawing Sheet

(51) Int. Cl.
  *B01D 19/00* (2006.01)
  *B01D 53/14* (2006.01)
(52) U.S. Cl.
  CPC ..... *B01D 53/1418* (2013.01); *B01D 53/1493* (2013.01); *C01B 7/0712* (2013.01); *B01D 2252/103* (2013.01); *C01B 2210/0009* (2013.01); *C01B 2210/0028* (2013.01); *C01B 2210/0042* (2013.01); *C01B 2210/0068* (2013.01); *C01B 2210/0098* (2013.01); *C01P 2006/80* (2013.01)

(58) Field of Classification Search
  CPC .... C01B 2210/0042; C01B 2210/0068; C01B 2210/0098; C01B 7/07; B01D 3/42; B01D 19/0005; B01D 53/1418; B01D 53/1493; B01D 2252/103; B01D 53/78; B01D 53/68; B01D 2257/2025; B01D 2257/2045; B01D 2257/7022; B01D 2258/02; B01D 1/14; B01D 19/00; B01D 53/14; C01P 2006/80
  See application file for complete search history.

(56) References Cited

FOREIGN PATENT DOCUMENTS

| | | |
|---|---|---|
| JP | S54-033297 A | 3/1979 |
| JP | H06-345410 A | 12/1994 |
| JP | 2007-091560 A | 4/2007 |
| JP | 2008-230927 A | 10/2008 |
| JP | 2009-001459 A | 1/2009 |

* cited by examiner

PRODUCTION METHOD FOR HIGH-PURITY HYDROGEN CHLORIDE GAS

TECHNICAL FIELD

The present invention relates to a method for producing a high-purity hydrogen chloride gas and a method for producing a high-purity hydrochloric acid using the high-purity hydrogen chloride gas as a raw material.

BACKGROUND ART

Hydrogen chloride gas and hydrochloric acid, which is obtained by allowing water to absorb this hydrogen chloride gas, are basic industrial raw materials with a wide range of applications, and particularly those with high purity are usefully used in the semiconductor manufacturing process for substrate etching and cleaning applications. Here, the production of hydrogen chloride gas can be achieved by direct synthesis through the reaction of chlorine and hydrogen, but other methods are also industrially beneficial, including methods for recovering byproducts of processes for producing chlorinated hydrocarbons such as vinyl chloride, methylene chloride, chloroform, and chlorobenzene, processes for producing fluorocarbons, processes for producing urethanes, and processes for producing polycarbonates. In particular, among the latter hydrogen chloride byproducing plants, production plants for vinyl chloride are numerous and scattered throughout the world, and their production volumes are large. Therefore, utilization of this byproduct hydrogen chloride gas is of great economic value.

However, it is inevitable for the latter byproduct hydrogen chloride gas, and also hydrochloric acid produced from it, to contain trace amounts of organic compounds originating from the raw organic materials. Meanwhile, in semiconductor manufacturing applications, where hydrogen chloride gas and hydrochloric acid are beneficially used, these organic impurities cause defects and reduced electrical characteristics in semiconductor devices, and therefore must be minimized as much as possible.

For this reason, it is known that the byproduct hydrogen chloride gas and the byproduct hydrochloric acid obtained from it are subjected to a variety of treatments for removing the organic impurities described above. Specifically, a representative method is to dissipate the organic impurities from the byproduct hydrochloric acid. Examples thereof include a method in which the byproduct hydrochloric acid is led to a flash tank controlled at a low pressure, where volatile organic impurities are dissipated together with a part of hydrogen chloride (see Patent Literature 1), and a method in which the byproduct hydrochloric acid is brought into contact with inert gas, whereby volatile organic impurities are dissipated (see Patent Literature 2). In addition, the latter dissipation method, in which the byproduct hydrochloric acid is brought into contact with inert gas, is said to be also effective in reducing bromine and bromide impurities contained in the byproduct hydrochloric acid (see Patent Literature 3).

In addition, in the byproduct hydrochloric acid from which the organic impurities will be removed by these dissipation methods, prior to its purification, metal impurities are also removed by azeotroping it through distillation to obtain the distillate (see, for example, Patent Literature 4).

CITATION LIST

Patent Literature

Patent Literature 1: Japanese Patent Laid-Open Publication No. 54-033297
Patent Literature 2: Japanese Patent Publication No. 49-034317
Patent Literature 3: Japanese Patent Laid-Open Publication No. 06-345410
Patent Literature 4: Japanese Patent Publication No. 43-30171

SUMMARY OF INVENTION

Technical Problem

In the byproduct hydrogen chloride gas and the byproduct hydrochloric acid obtained by such purification methods using dissipation, the organic impurities are in most cases reduced quite well, and many of them are acceptable for use in the semiconductor manufacturing applications. However, it has been found that, when the byproducing plants of the hydrogen chloride are the production plants for vinyl chloride, specifically, plants that produce vinyl chloride by thermal decomposition of 1,2-dichloroethane, these methods cannot remove the organic impurities at a satisfactorily high level, and in particular, significant containment of low molecular weight carboxylic acids including formic acid and acetic acid is uniquely observed. This is because, in the thermal decomposition reaction of 1,2-dichloroethane described above, a large amount of ethylene and acetylene are generated as byproducts and since a part of them undergoes an oxidation reaction with water, resulting in generation of the above-described low molecular weight carboxylic acids including formic acid and acetic acid, and in particular, the presence of the latter low molecular weight carboxylic acids is not recognized and appropriate removal measures are thus not taken.

Therefore, the obtained hydrogen chloride gas and hydrochloric acid are not sufficiently suitable for use in the semiconductor manufacturing applications, where miniaturization and lamination of wiring and integrated circuits have been increasingly advancing in recent years, and there was room for further improvement. With the background described above, an object of the present invention is to develop a production method that enhances the removal properties for low molecular weight carboxylic acids including formic acid and acetic acid in the byproduct hydrogen chloride gas from the production plants for vinyl chloride and the byproduct hydrochloric acid produced therefrom, and that yields high-purity byproduct hydrogen chloride gas and byproduct hydrochloric acid that can be also used for semiconductor applications.

Solution to Problem

In view of the above problems, the present inventors have continued diligent investigations. As a result, they have found that the problems described above can be solved by allowing water to absorb the byproduct hydrogen chloride gas from vinyl chloride production plants and subjecting the obtained crude hydrochloric acid to a specific dissipation treatment in combination with a distillation treatment, thereby achieving a high degree of removal of the organic impurities. The present invention has been thus completed. In other words, the present invention recognizes the unique problems in the case of producing hydrogen chloride using, as a raw material, the byproduct hydrogen chloride gas generated during the production of vinyl chloride, and provides a new means for solving these unique problems.

That is, the present invention provides a method for producing a high-purity hydrogen chloride gas, characterized by comprising performing a purification process that includes the following steps 1) to 3) by using, as a raw material, a byproduct hydrogen chloride gas generated when producing vinyl chloride by thermally decomposing 1,2-dichloroethane:

1) a crude hydrochloric acid generation step of allowing water to absorb the byproduct hydrogen chloride gas;
2) a volatile organic impurity-removed hydrochloric acid generation step of bringing the crude hydrochloric acid obtained in the step 1) into contact with an inert gas at a liquid temperature of 20 to 45° C. to dissipate volatile organic impurities; and
3) a high-purity hydrogen chloride gas generation step of supplying the volatile organic impurity-removed hydrochloric acid obtained in the step 2) to a distillation column and performing distillation under conditions of a column bottom temperature of higher than 60° C. and 108° C. or lower and a column top temperature of 60° C. or lower to distill out a high-purity hydrogen chloride gas.

In addition, the present invention also provides a method for producing a high-purity hydrochloric acid, comprising, after performing the above-described method for producing a high-purity hydrogen chloride gas:

4) a high-purity hydrochloric acid generation step of allowing water to absorb the high-purity hydrogen chloride gas obtained in the step 3).

Advantageous Effects of Invention

According to the present invention, from the byproduct hydrogen chloride gas from the production plant for vinyl chloride, high-purity hydrogen chloride gas and hydrochloric acid from which organic impurities, especially formic acid and acetic acid, have been removed to a high degree can be obtained. Accordingly, the hydrogen chloride gas and the hydrochloric acid can be suitably used in semiconductor applications, more specifically, in the manufacturing process for semiconductor devices, the hydrogen chloride gas as etching gas or cleaning gas, and the hydrochloric acid as etching solution or cleaning solution.

As described above, the production plants for vinyl chloride are numerous and scattered throughout the world, and their production volumes are large. Therefore, it is of extremely great industrial value to make the high-purity hydrogen chloride gas and hydrochloric acid produced from the byproduct hydrogen chloride gas from those plants usable for the semiconductor applications.

DESCRIPTION OF EMBODIMENTS

Hereinafter, embodiments of the present invention will be described in detail below. However, the present invention is not limited to these embodiments.

In the production method of the present invention, using, as a raw material, byproduct hydrogen chloride gas generated during thermal decomposition of 1,2-dichloroethane to produce vinyl chloride, a purification process that includes the steps 1) to 3) and, if required, step 4), which will be mentioned later, is performed. Vinyl chloride is useful as a precursor to polyvinyl chloride, which is a versatile synthetic resin, and is also utilized as a non-polar aprotic solvent for cleaning agents, paints, and solvents for a variety of organic syntheses. Its production plants that are based on the thermal decomposition of 1,2-dichloroethane are scattered throughout the world, and their production volumes are large.

Here, in the production method for vinyl chloride described above, 1,2-dichloroethane to be thermally decomposed is produced by the so-called oxychlorination reaction, in which ethylene is allowed to react with hydrogen chloride and oxygen. This is method is preferred because it is a versatile production method for 1,2-dichloroethane and its production volume is large, or the like. The thermal decomposition of 1,2-dichloroethane is covered without limitation by known methods in which it is heated to generate hydrogen chloride to produce vinyl chloride. This is usually performed under a high pressure of 1 to 5 MPa and at a high temperature of about 450 to 540° C.

The byproduct hydrogen chloride gas from this thermal decomposition contains significant amounts of volatile organic materials with boiling points of 0° C. or lower, such as ethylene, acetylene, and vinyl chloride. Usually, ethylene is contained in an amount of 5 to 100 ppm, more commonly 10 to 50 ppm, and acetylene is contained in an amount of 10 to 1000 ppm, more commonly 50 to 500 ppm. In addition to the volatile organic materials described above, water-soluble organic materials, metals, and other materials are also contained.

Note that, in the present invention, each of the concentrations of ethylene and acetylene in hydrogen chloride gas and hydrochloric acid mean the values analyzed by gas chromatography. Moreover, the values for low molecular weight carboxylic acids and a bromine ion in hydrochloric acid are values analyzed by ion chromatography. Furthermore, the values for metal components in hydrochloric acid are values analyzed by an ICP-MS (inductively coupled plasma mass spectrometer).

Figure 1:
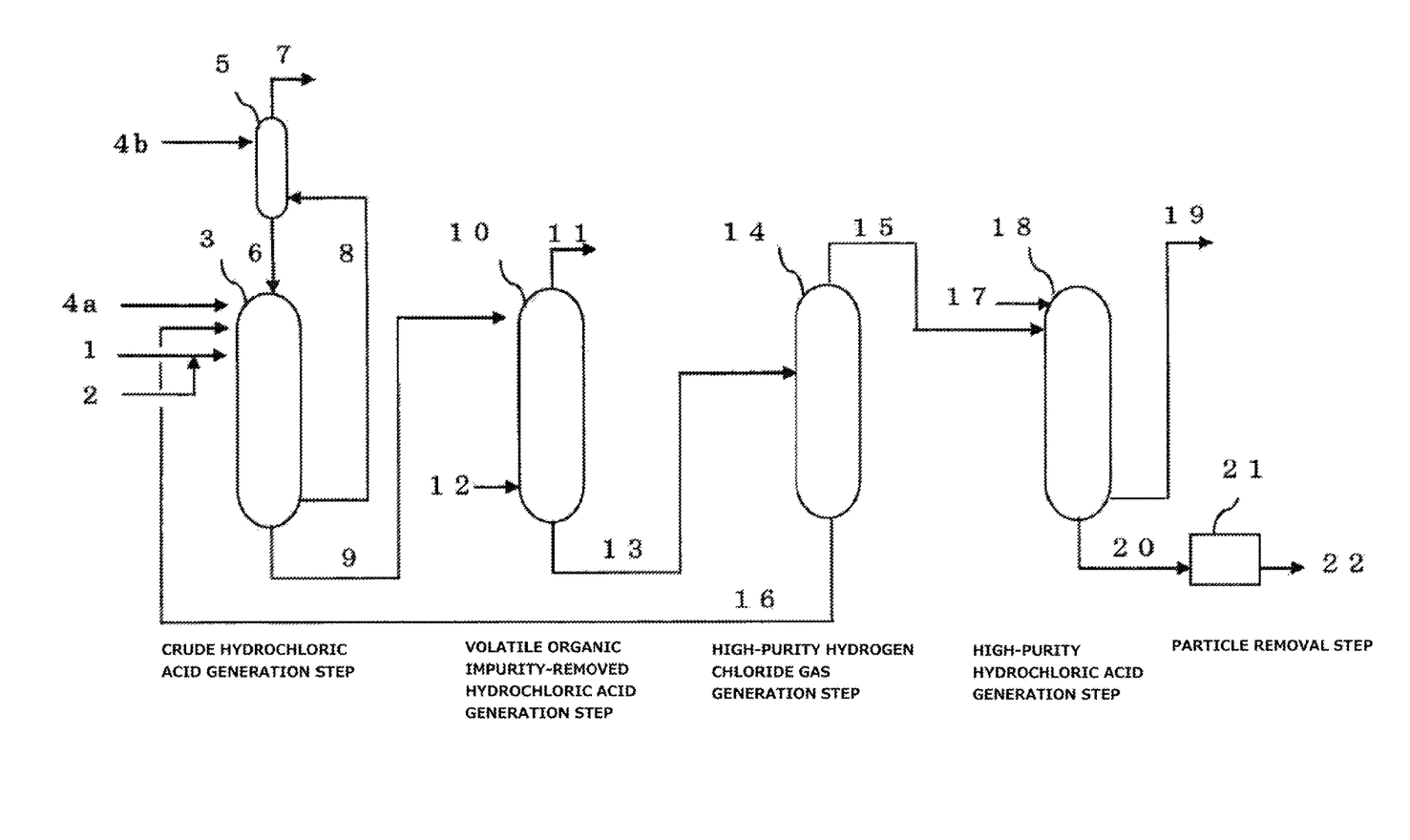
FIG. 1 is a process diagram showing a representative aspect of the method for producing high-purity hydrogen chloride gas of the present invention.

In the present invention, such byproduct hydrogen chloride gas is highly purified by the production method as shown in FIG. 1. That is, FIG. 1 is a process diagram showing a representative aspect of the method for producing high-purity hydrogen chloride gas of the present invention. The byproduct hydrogen chloride gas produced by the thermal decomposition of 1,2-dichloroethane is supplied from byproduct hydrogen chloride gas supply piping (1).

1) [Crude Hydrochloric Acid Generation Step]

In this step, the byproduct hydrogen chloride gas supplied from the byproduct hydrogen chloride gas supply piping (1) is absorbed by water and turned into crude hydrochloric acid. This absorption of the byproduct hydrogen chloride gas into water is not particularly limited, but a format that efficiently removes the heat of absorption is preferred. For example, wetted-wall columns, which use liquid films of water, packed columns, and absorption columns having numerous gas supply nozzles arranged are commonly used.

That is, the byproduct hydrogen chloride gas supply piping (1) is coupled to inert gas supply piping (2), after which it is linked to a byproduct hydrogen chloride gas absorption column (3). To this byproduct hydrogen chloride gas absorption column (3), a pure water supply pipe (4a) is linked at the upper part thereof, and while pure water supplied from this pipe flows down the byproduct hydrogen chloride gas absorption column (3), it comes into contact with the byproduct hydrogen chloride gas supplied from the byproduct hydrogen chloride gas supply piping (1) to the upper part of the column (3) in parallel flow, and the byproduct hydrogen chloride gas is absorbed by the pure water to generate crude hydrochloric acid. Among the impurities contained in the crude hydrochloric acid, volatile organic materials such as ethylene and acetylene are partially distilled off from the column bottom of the byproduct hydrogen chloride gas absorption column (3).

The water supplied from the pure water supply pipe (4a) preferably has purity as high as possible without containing metal components, and it is desirable to use the so-called ultrapure water. It is preferable to supply the pure water in an amount that will result in a hydrochloric acid concentration of 35 to 37% by mass in the crude hydrochloric acid generated in the byproduct hydrogen chloride gas absorption column (3).

Inert gas supplied from the inert gas supply piping (2) is effective in suppressing absorption of organic materials contained in the byproduct hydrogen chloride gas into the pure water. There are no restrictions on such inert gas as long as it does not react with hydrogen chloride, and suitable examples thereof include nitrogen and air. Nitrogen is particularly preferred because oxidation reactions can be eliminated.

Mixing of the inert gas with the byproduct hydrogen chloride gas may be performed in the column by supplying it to the byproduct hydrogen chloride gas absorption column (3) separately from the byproduct hydrogen chloride gas. However, in order to fully exert the effect of suppressing absorption of organic materials contained in the byproduct hydrogen chloride gas into the pure water, as shown in FIG. 1, it is preferable to perform the mixing in advance of supplying to the absorption column by coupling the inert gas supply piping (2) in the middle of the byproduct hydrogen chloride gas supply piping (1) to enhance its uniformity. The supplied amount of the inert gas is not particularly limited, and usually, it is preferably 0.0001 to 0.05, and still more preferably 0.0002 to 0.01, by volume ratio when the volume of the byproduct hydrogen chloride gas is defined as 1.

The temperature of the byproduct hydrogen chloride gas absorption column (3) is preferably set in consideration of the absorption properties of the byproduct hydrogen chloride gas into water, and also to avoid a rapid temperature rise due to the heat of absorption, since an excessively high temperature may accelerate the hydration reaction in ethylene, acetylene, and other materials contained as volatile organic impurities. The temperature is usually 55° C. or lower, and still more suitably 30 to 50° C. When the temperature rise due to the heat of absorption of hydrogen chloride is intense, an aspect is also suitable in which the byproduct hydrogen chloride gas supply piping (1) is branched into multiple lines to divide the supplying of hydrogen chloride to the byproduct hydrogen chloride gas absorption column (3).

Note that, among the byproduct hydrogen chloride gas supplied to the byproduct hydrogen chloride gas absorption column (3), the remainder that has not been absorbed by water is discharged as unrecovered gas into an unrecovered gas discharge pipe (8). Such an unrecovered gas discharge pipe (8) is coupled to an unrecovered gas absorption column (5), and a pure water supply pipe (4b) is also linked to the unrecovered gas absorption column (5) to absorb hydrogen chloride from the unrecovered gas in that column. Thereafter, the obtained recovered hydrochloric acid is supplied to the byproduct hydrogen chloride gas absorption column (3) via a recovered hydrochloric acid supply pipe (6), and utilized as a part of the crude hydrochloric acid generated therein, which is a suitable aspect.

The crude hydrochloric acid generated in this step contains 3 ppm or more of low molecular weight carboxylic acids consisting of formic acid and acetic acid, and more commonly 6 to 20 ppm. In addition, when the byproduct hydrogen chloride gas supplied to the present method is obtained in a thermal decomposition reaction of 1,2-dichloroethane wherein the 1,2-dichloroethane is obtained by an oxychlorination reaction using ethylene, hydrogen chloride, and oxygen as raw materials, or the like, this byproduct hydrogen chloride gas contains a large amount of bromine and bromides. That is, the crude hydrochloric acid usually contains 5 ppm or more of bromine ions, and more commonly 6 to 40 ppm.

2) [Volatile Organic Impurity-Removed Hydrochloric Acid Generation Step]

In this step, the crude hydrochloric acid obtained in the crude hydrochloric acid generation step is purified by bringing it into contact with an inert gas at a liquid temperature of 20 to 45° C. to dissipate volatile organic impurities. The dissipation method is not particularly limited, and from the standpoint of efficiency, it is preferable to carry out the dissipation by counterflow contact in which hydrochloric acid is distributed from the upper side to the lower side and the inert gas is distributed from the lower side to the upper side.

By bringing the crude hydrochloric acid into contact with the inert gas at the liquid temperature described above, volatile organic impurities such as ethylene, acetylene, and vinyl chloride, which are contained due to the fact that the byproduct hydrogen chloride gas is obtained from the thermal decomposition of 1,2-dichloroethane, are dissipated and removed. At this time, the liquid temperature of the crude hydrochloric acid, which is brought into contact with the inert gas, is required to be 20 to 45° C. as described above, and more suitably 25 to 40° C. When the liquid temperature of the crude hydrochloric acid is lower than 20° C., the dissipation properties of volatile organic impurities decrease and a sufficient purification effect cannot be obtained. On the other hand, when the liquid temperature of the crude hydrochloric acid is higher than 45° C., evaporation of hydrogen chloride also begins to be intense, and the production efficiency for high-purity hydrogen chloride gas decreases.

When this step is illustrated more specifically in the process diagram of FIG. 1, the crude hydrochloric acid drained from the column bottom of the byproduct hydrogen chloride gas absorption column (3) is transferred via crude hydrochloric acid supply piping (9) and supplied to the upper side of a crude hydrochloric acid dissipation column (10). To this crude hydrochloric acid dissipation column (10), inert gas supply piping (12) is also linked at the column lower side, and as the inert gas supplied from here rises in the column, it comes into contact with the crude hydrochloric acid supplied from the crude hydrochloric acid supply piping (9) and flowing down the column at the liquid temperature of 20 to 45° C. as described above. Then, the volatile organic impurities dissipated by this contact rise to the column top accompanying the upward flow of the inert gas, and are discharged from volatile organic impurity discharge piping (11).

Similarly as in the above-described [Crude Hydrochloric Acid Generation Step], nitrogen, air, or other gases can be used as the inert gas supplied from the inert gas supply piping (12), and nitrogen is particularly suitable. The supplied amount of the inert gas is also as in the case of the above-described [Crude Hydrochloric Acid Generation Step], preferably 0.0001 to 0.05, and still more preferably 0.0002 to 0.01, by volume ratio when the volume of the byproduct hydrogen chloride gas dissolved in the crude hydrochloric acid is defined as 1.

Note that, in the crude hydrochloric acid dissipation column (10), the flow rate of the crude hydrochloric acid is at a linear velocity of preferably 10 to 200 m/h, still more preferably 15 to 100 m/h, and at a space velocity of preferably 1 to 80/h, still more preferably 2 to 30/h.

By this step, the crude hydrochloric acid will have highly reduced contents of volatile organic impurities, and usually, the amounts of ethylene and acetylene can be reduced to 1 ppm or less and 1 ppm or less, respectively.

3) [High-Purity Hydrogen Chloride Gas Generation Step]

The biggest feature of the present invention is that the volatile organic impurity-removed hydrochloric acid generated in the previous step is supplied to a distillation column and distilled under conditions of a column bottom temperature of higher than 60° C. and 108° C. or lower and a column top temperature of 60° C. or lower. The volatile organic impurities such as ethylene and acetylene contained in the crude hydrochloric acid are removed well by the contact of the inert gas with the crude hydrochloric acid in the previous step. However, this volatile organic impurity-removed hydrochloric acid contains a significant amount of low molecular weight carboxylic acids including formic acid and acetic acid when the byproduct hydrogen chloride gas, which is subjected to purification, is obtained from the thermal decomposition reaction of 1,2-dichloroethane, as described above. Generally, the low molecular weight carboxylic acids consisting of formic acid and acetic acid are maintained at approximately the same concentration as in the crude hydrochloric acid, and are contained at 3 ppm or more, and more commonly at 6 to 20 ppm. Such low molecular weight carboxylic acids can also be removed to a high degree in the present step by distilling the volatile organic impurity-removed hydrochloric acid under the conditions described above and allowing it to be distilled out as high-purity hydrogen chloride gas.

Note that hydrogen chloride obtained by the synthesis of chlorine and hydrogen, which is the most common method for producing hydrogen chloride gas, does not contain low molecular weight carboxylic acids such as formic acid because the raw material gas does not contain acetylene or ethylene. Accordingly, when this synthetic hydrogen chloride is used as a raw material to produce high-purity hydrogen chloride gas, the effects peculiar to the present invention cannot be obtained even if the treatment of the present step is carried out. In other words, the treatment of the present step is effective in a specific case where the byproduct hydrogen chloride gas obtained from the thermal decomposition reaction of 1,2-dichloroethane is used as a raw material.

By this distillation, the metal impurities contained in the byproduct hydrogen chloride gas can also be removed from the high-purity hydrogen chloride gas as a component remaining in the column bottom liquid.

In addition, as described above, when the byproduct hydrogen chloride gas supplied to the present method is obtained in a thermal decomposition reaction of 1,2-dichloroethane wherein the 1,2-dichloroethane is obtained by an oxychlorination reaction, this byproduct hydrogen chloride gas often contains a significant amount of bromine impurities including bromine and hydrogen bromide, and these are not sufficiently removed up to the previous step. That is, such volatile organic impurity-removed hydrochloric acid also maintains approximately the same concentration as in the crude hydrochloric acid, and usually contains 5 ppm or more of bromine ions, and more commonly 6 to 30 ppm. Therefore, when the volatile organic impurity-removed hydrochloric acid is distilled under the conditions described above in the present step, such bromine impurities are also removed to a high degree in the resulting high-purity hydrogen chloride gas, which is preferable.

Here, it is extremely important to set the column bottom temperature of the distillation column to higher than 60° C. and 108° C. or lower. That is, the boiling points of the low molecular weight carboxylic acids, in other words, formic acid and acetic acid, are 100.8° C. and 117.9° C., respectively, and therefore, when the column bottom temperature of the distillation column is raised too high above the upper limit temperature, their removal performance may be unstable. From the viewpoint of sufficiently removing not only formic acid but also acetic acid and reducing the content of the low molecular weight carboxylic acids to a high degree, it is more preferable to set the column bottom temperature of the distillation column to 98° C. or lower. On the other hand, when the column bottom temperature of the distillation column is lower than 60° C., the distillation efficiency for hydrochloric acid is decreased. Also, when the byproduct hydrogen chloride gas contains a large amount of bromine impurities due to the origin of the byproduct hydrogen chloride gas, or the like, an increased amount of hydrogen bromide is distilled out. Accordingly, from the viewpoint of distillation efficiency and suppression of hydrogen bromide distillation, the column bottom temperature is preferably 65° C. or higher, more preferably 70° C. or higher, and still more preferably 90° C. or higher.

It is also necessary to set the column top temperature of the distillation column to 60° C. or lower, more preferably to 30 to 50° C. This is because, when the column top temperature is set to higher than the above-described 60° C., water is significantly distilled out, and accompanying this, the low molecular weight carboxylic acids, which are water-soluble compounds, may also be distilled out.

When this step is illustrated more specifically in the process diagram of FIG. 1, the crude hydrochloric acid drained from the column bottom of the crude hydrochloric acid dissipation column (10) is transferred via volatile organic impurity-removed hydrochloric acid supply piping (13) and supplied to a volatile organic impurity-removed hydrochloric acid distillation column (14). Here, there is no particular limitations on the column type of the volatile organic impurity-removed hydrochloric acid distillation column (14), and packed columns, plate columns, and other types generally used for distillation and purification are used. Further, as the packing material to be packed in packed columns, existing materials can be used, such as Raschig rings, Pall rings, and SPIRAX (registered trademark).

The distillation is performed in the volatile organic impurity-removed hydrochloric acid distillation column (14) with a column bottom temperature of higher than 60° C. and 108° C. or lower, and the column top is cooled to 60° C. or lower to distill out the high-purity hydrogen chloride gas into high-purity hydrogen chloride gas supply piping (15). Further, the column bottom liquid of the volatile organic impurity-removed hydrochloric acid distillation column (14) has a hydrochloric acid concentration of about 20 to 30% by weight. This column bottom liquid may be discharged as is, or it may be circulated to the crude hydrochloric acid on the upstream side. Specifically, in the present invention, it is desirable to circulate the column bottom liquid to a part of the crude hydrochloric acid supplied to the byproduct hydrogen chloride gas absorption column (3) or the crude hydrochloric acid dissipation column (10) via column bottom liquid resupply piping (16). In particular, it is desirable to circulate the column bottom liquid to a part of the crude hydrochloric acid supplied to the byproduct hydrogen chloride gas absorption column (3) in order to minimize the amount of hydrochloric acid to be disposed of.

Circulating the column bottom liquid in this manner is efficient because it increases the production efficiency for the high-purity hydrogen chloride gas relative to the supplied byproduct hydrogen chloride gas. Further, when this circulation of the column bottom liquid is performed with the liquid temperature cooled to 20 to 50° C., it has the effect of diluting and suppressing the rapid temperature rise due to absorption of the byproduct hydrogen chloride gas into water. By doing so, the hydration reaction of unsaturated compounds such as ethylene and acetylene contained in the byproduct hydrogen chloride gas can be suppressed, and generation of the low molecular weight carboxylic acids into the crude hydrochloric acid can be reduced.

As a result of the above, the high-purity hydrogen chloride gas is obtained from the high-purity hydrogen chloride gas supply piping (15) of the volatile organic impurity-removed hydrochloric acid distillation column (14). In this high-purity hydrogen chloride gas, the low molecular weight carboxylic acids consisting of formic acid and acetic acid, which cannot be sufficiently removed in the step 2), are well reduced. Specifically, it can be reduced to 1 ppm or less, as indicated by the values measured by dissolving the high-purity hydrogen chloride gas in ultrapure water to make 35 mass % hydrochloric acid. Furthermore, the contents of metal impurities can be reduced to 10 ppt or less for each metal element. Here, the target metal elements of metal impurities are mainly the following nine types: sodium, magnesium, aluminum, calcium, iron, nickel, copper, potassium, and zinc. However, in addition to the above, the target metal elements also include silver, arsenic, barium, cadmium, cobalt, chromium, gallium, germanium, lithium, manganese, lead, tin, strontium, gold, beryllium, bismuth, mercury, molybdenum, niobium, tantalum, thallium, vanadium, zirconium, boron, antimony, titanium, silicon, and phosphorous, making a total of 37 types. The contents described above refer to the concentrations in 35 mass % hydrochloric acid.

The high-purity hydrogen chloride gas can be used without limitations for a variety of industrial applications. Because of its high purity, it is preferably used for semiconductors and is specifically useful as etching gas or cleaning gas.

4) [High-Purity Hydrochloric Acid Generation Step]

The high-purity hydrogen chloride gas obtained in the step 3) may be absorbed into water to make high-purity hydrochloric acid. By making it into high-purity hydrochloric acid, it can be suitably used as etching solution, cleaning solution, or the like in semiconductor applications.

This absorption of the high-purity hydrogen chloride gas into water may be performed in the same manner as the absorption of the byproduct hydrogen chloride gas into water in the step 1). As illustrated in the process diagram of FIG. 1, the high-purity hydrogen chloride gas transferred via the high-purity hydrogen chloride gas supply piping (15) is supplied to the upper part of a high-purity hydrogen chloride gas absorption column (18). To this high-purity hydrogen chloride gas absorption column (18), a pure water supply pipe (17) is linked at the upper part thereof, and while pure water supplied from this pipe flows down the high-purity hydrogen chloride gas absorption column (18), it comes into contact with the byproduct hydrogen chloride gas supplied from the high-purity hydrogen chloride gas supply piping (15) to the column (18) in parallel flow, and the byproduct hydrogen chloride gas is absorbed by the pure water to generate high-purity hydrochloric acid.

Here, in order to further increase the purity of the high-purity hydrochloric acid, for devices that come in contact with hydrochloric acid, it is preferable to use materials that do not elute metals, ammonium ions, sulfate ions, nitrate ions, and the like. That is, in the method of the present invention, the material of each device used in each step is usually carbon, tantalum, or ceramic. Many of the materials of the device elute impurity ions when in contact with hydrochloric acid, and in the present step where the high-purity hydrochloric acid is produced, it is preferable to select a material that elutes as few of these impurities as possible.

In particular, for parts where hydrogen chloride is absorbed and the temperature rises with the heat of absorption, specifically a gas-liquid contact part and a heat exchange part of the high-purity hydrogen chloride gas absorption column (18), it is desirable to adopt a material from which the above-described impurity ions are not eluted to a high degree, and a material with strong acid resistance is selected. Specifically, it is preferable to coat the surface of a metal material with a fluororesin such as tetrafluoroethylene resin (PTFE), tetrafluoroethylene-perfluoroalkoxyethylene copolymer resin (PFA), tetrafluoroethylene-hexafluoropropylene copolymer resin (FEP), tetrafluoroethylene-ethylene copolymer resin (ETFE), and vinylidene fluoride (PVDF).

In the high-purity hydrochloric acid thus obtained, the content of the low molecular weight carboxylic acids consisting of formic acid and acetic acid is preferably 1 ppm or less. Further, the high-purity hydrochloric acid has an ethylene content of 1 ppm or less and an acetylene content of 1 ppm or less. Furthermore, the content of metal impurities is 10 ppt or less.

5) [Particle Removal Step]

Although the metal impurities are also reduced to a high degree in the high-purity hydrochloric acid produced as described above, this high-purity hydrochloric acid is likely to be contaminated by a slight amount of metal particulates that have accompanied the hydrogen chloride gas as droplets during the distillation in the step 3), or have been contained originating from the device material or the like after the distillation. Furthermore, in addition to the metal particulates, the high-purity hydrochloric acid is often contaminated by a variety of inorganic and organic dust particulates from various environments. In the semiconductor manufacturing process, when particulate impurities such as the metal particulates as described above are attached to the substrate surface, it may cause defects that lead to poor quality in the increasingly miniaturized wiring and integrated circuits. Therefore, in order to remove the particulate impurities, it is preferable to perform a treatment with a particulate capturing filter on the high-purity hydrochloric acid.

By the treatment with a particulate capturing filter, charged metal impurities in the hydrochloric acid can also be reduced to a high degree, which also has a secondary effect of better filtration by the filter. That is, when the high-purity hydrochloric acid in the complicated ionic coexistence state is subjected to a filter treatment, agglomerated particles are easily generated due to adsorption of the charged impurities on particulate impurities, for example, and smooth filtration may be hindered. However, this problem is solved by the treatment by a particulate capturing filter.

The particulate capturing filter is not particularly limited as long as it is made of a material with strong acid resistance, and those made of a fluororesin such as tetrafluoroethylene resin (PTFE), tetrafluoroethylene-perfluoroalkoxyethylene copolymer resin (PFA), tetrafluoroethylene-hexafluoropropylene copolymer resin (FEP), tetrafluoroethylene-ethylene copolymer resin (ETFE), and vinylidene fluoride (PVDF) are preferred.

It is preferable that the filter to be installed have a rated filtration accuracy of 0.2 µm or less, considering that it is used for etching agents in the semiconductor manufacturing process, for example, and those that can cope with a filtration accuracy of 0.1 µm to 0.05 µm are typically used. Note that, when removal of finer particulate impurities is required, filters with a pore diameter smaller than the above-described 0.05 µm are also used well.

The filter can be of any known shape, such as flat membrane, hollow fiber membrane, tubular membrane, and monolithic membrane. The filtering treatment may be performed by pumping the hydrochloric acid obtained by dissipative absorption through the particulate capturing filter or other means. In order to carry out more efficient particle capturing, it is suitable to install multiple stages of filters with different pore diameters.

By illustrating such a particle removal step in the process diagram of FIG. 1, the high-purity hydrochloric acid drained from the column bottom of the high-purity hydrogen chloride gas absorption column (18) is transferred via high-purity hydrochloric acid supply piping (20), in the middle of which a particulate capturing filter (21) is provided, where the high-purity hydrochloric acid is subjected to the filtering treatment and purified.

EXAMPLES

Hereinafter, the present invention will be described in further detail with reference to Examples, but the present invention is not limited to these Examples.

Example 1

By using byproduct hydrogen chloride gas generated during thermal decomposition of 1,2-dichloroethane to produce vinyl chloride and carrying out the purification process shown in FIG. 1 up to the step of producing high-purity hydrochloric acid in the [High-Purity Hydrochloric Acid Generation Step], high-purity hydrogen chloride gas and high-purity hydrochloric acid were produced, respectively. In this production, the above-described 1,2-dichloroethane subjected to thermal decomposition was produced by an oxychlorination reaction using ethylene as a raw material. The byproduct hydrogen chloride gas generated by the thermal decomposition had an ethylene content of 40 ppm and an acetylene content of 400 ppm, as measured by gas chromatography.

In the [Crude Hydrochloric Acid Generation Step], the byproduct hydrogen chloride gas was supplied to the byproduct hydrogen chloride gas absorption column (3) via the byproduct hydrogen chloride gas supply piping (1) at a flow rate of 60 m$^3$/h, and nitrogen gas was also supplied via the inert gas supply piping (2) at a flow rate of 0.32 m$^3$/h. Furthermore, pure water was supplied from the pure water supply pipe (4a) to the byproduct hydrogen chloride gas absorption column (3) at a flow rate of 150 kg/h. Moreover, pure water was supplied from the pure water supply pipe (4b) to the unrecovered gas absorption column (5) at a flow rate of 27 kg/h. The temperature of the byproduct hydrogen chloride gas absorption column (3) and of the unrecovered gas absorption column (5) was 40° C., respectively.

Through this operation, 35 mass % of crude hydrochloric acid was generated in the byproduct hydrogen chloride gas absorption column (3) at a flow rate of 274 kg/h and flowed into the crude hydrochloric acid supply piping (9). Here, the above-described crude hydrochloric acid contained 8 ppm of the low molecular weight carboxylic acids consisting of formic acid and acetic acid, as measured by ion chromatography. It also contained 20 ppm of bromine ions. Furthermore, the metal impurities were analyzed by ICP-MS and found to be 1070 ppt of sodium, 110 ppt of magnesium, 2630 ppt of aluminum, 1030 ppt of calcium, 680 ppt of iron, 630 ppt of nickel, 150 ppt of copper, 250 ppt of potassium, and 200 ppt of zinc. Note that the crude hydrochloric acid had an ethylene content of 1 ppm or less and an acetylene content of 1 ppm or less, as measured by gas chromatography.

In the subsequent [Volatile Organic Impurity-Removed Hydrochloric Acid Generation Step], the crude hydrochloric acid was supplied to the crude hydrochloric acid dissipation column (10) via the crude hydrochloric acid supply piping (9) at 274 kg/h, and nitrogen gas was also supplied to the crude hydrochloric acid dissipation column (10) via the inert gas supply piping (12) at a flow rate of 0.8 m$^3$/h. The liquid temperature of the crude hydrochloric acid flowing down the crude hydrochloric acid dissipation column (10) was 30° C., and the crude hydrochloric acid was brought into contact with the nitrogen gas at this liquid temperature. Further, in this column, the flow rate of the crude hydrochloric acid was at a linear velocity of 16 m/h and at a space velocity of 4/h.

Through this operation, volatile organic impurity-removed hydrochloric acid was generated in the crude hydrochloric acid dissipation column (10) at a flow rate of 270 kg/h and flowed into the volatile organic impurity-removed hydrochloric acid supply piping (13). Here, in the above-described volatile organic impurity-removed hydrochloric acid, the content of ethylene was reduced to 1 ppm or less, as measured by gas chromatography, and the content of acetylene was also reduced to 1 ppm or less. Note that the content of the low molecular weight carboxylic acids was maintained at 8 ppm as measured by ion chromatography, and the content of bromine ions was also maintained at 20 ppm.

In the subsequent [High-Purity Hydrogen Chloride Gas Generation Step], the volatile organic impurity-removed hydrochloric acid was supplied to the volatile organic impurity-removed hydrochloric acid distillation column (14) via the volatile organic impurity-removed hydrochloric acid supply piping (13), and distilled under conditions of a column bottom temperature of 95° C. and a column top temperature of 60° C. The volatile organic impurity-removed hydrochloric acid distillation column (14) was a packed column made of quartz glass and packed with quartz Raschig rings.

Through this operation, high-purity hydrogen chloride gas was generated at the column top of the volatile organic impurity-removed hydrochloric acid distillation column (14) at a flow rate of 14 m$^3$/h and flowed into the high-purity hydrogen chloride gas supply piping (15).

In the subsequent [High-Purity Hydrochloric Acid Generation Step], the high-purity hydrogen chloride gas was supplied to the high-purity hydrogen chloride gas absorption column (18) via the high-purity hydrogen chloride gas supply piping (15) at a flow rate of 14 m$^3$/h, and pure water was also supplied via the pure water supply piping (17) at a flow rate of 42 kg/h. The temperature of the high-purity hydrogen chloride gas absorption column (18) was 40° C.

Further, the inner surface of the above-described high-purity hydrogen chloride gas absorption column (18) was covered with PFA.

Through this operation, 35 mass % of high-purity hydrochloric acid was generated in the high-purity hydrogen chloride gas absorption column (18) at a flow rate of 64 kg/h and flowed into the high-purity hydrochloric acid supply piping (20). Here, in the above-described high-purity hydrochloric acid, the content of the low molecular weight carboxylic acids was reduced to 2 ppm, as measured by ion chromatography, and the content of bromine ions was also reduced to 1 ppm or less. Furthermore, the metal impurities were analyzed by ICP-MS and it was found that each of sodium, magnesium, aluminum, calcium, iron, nickel, copper, potassium, zinc, sodium, magnesium, aluminum, calcium, iron, nickel, copper, potassium, zinc, silver, arsenic, barium, cadmium, cobalt, chromium, gallium, germanium, lithium, manganese, lead, tin, strontium, gold, beryllium, bismuth, mercury, molybdenum, niobium, tantalum, thallium, vanadium, zirconium, boron, antimony, titanium, silicon, and phosphorous was reduced to 10 ppt or less. Note that the high-purity hydrochloric acid had an ethylene content of 1 ppm or less and an acetylene content of 1 ppm or less, as measured by gas chromatography.

Note that the content of the low molecular weight carboxylic acids, the content of bromine ions, the contents of the metal impurities, the ethylene content, and the acetylene content in the high-purity hydrogen chloride gas at the column top of the volatile organic impurity-removed hydrochloric acid distillation column (14) were determined by multiplying the measured values by 100/35-fold, taking into account the hydrochloric acid concentration.

Example 2

High-purity hydrogen chloride gas and high-purity hydrochloric acid were both produced in the same manner as in Example 1, except that the distillation of the volatile organic impurity-removed hydrochloric acid in the [High-Purity Hydrogen Chloride Gas Generation Step] in Example 1 was performed changing the column top temperature of the volatile organic impurity-removed hydrochloric acid distillation column (14) to 50° C.

In the obtained high-purity hydrochloric acid, the content of the low molecular weight carboxylic acids was 1 ppm or less, as measured by ion chromatography, and the content of bromine ions was also 1 ppm or less. Furthermore, the metal impurities were analyzed by ICP-MS and it was found that each of sodium, magnesium, aluminum, calcium, iron, nickel, copper, potassium, zinc, silver, arsenic, barium, cadmium, cobalt, chromium, gallium, germanium, lithium, manganese, lead, tin, strontium, gold, beryllium, bismuth, mercury, molybdenum, niobium, tantalum, thallium, vanadium, zirconium, boron, antimony, titanium, silicon, and phosphorous was as low as 10 ppt or less. Note that the high-purity hydrochloric acid had an ethylene content of 1 ppm or less and an acetylene content of 1 ppm or less, as measured by gas chromatography.

Further, the content of the low molecular weight carboxylic acids, the content of bromine ions, the contents of the metal impurities, the ethylene content, and the acetylene content in the high-purity hydrogen chloride gas at the column top of the volatile organic impurity-removed hydrochloric acid distillation column (14) were determined by multiplying the measured values by 100/35-fold, taking into account the hydrochloric acid concentration.

Example 3

High-purity hydrogen chloride gas and high-purity hydrochloric acid were both produced in the same manner as in Example 1, except that the distillation of the volatile organic impurity-removed hydrochloric acid in the [High-Purity Hydrogen Chloride Gas Generation Step] in Example 1 was performed changing the column top temperature of the volatile organic impurity-removed hydrochloric acid distillation column (14) to 70° C.

In the obtained high-purity hydrochloric acid, the content of the low molecular weight carboxylic acids was 2 ppm or less and the content of bromine ions was also 1 ppm or less. Furthermore, the metal impurities were found that each of sodium, magnesium, aluminum, calcium, iron, nickel, copper, potassium, zinc, silver, arsenic, barium, cadmium, cobalt, chromium, gallium, germanium, lithium, manganese, lead, tin, strontium, gold, beryllium, bismuth, mercury, molybdenum, niobium, tantalum, thallium, vanadium, zirconium, boron, antimony, titanium, silicon, and phosphorous was as low as 10 ppt or less. Note that the high-purity hydrochloric acid had an ethylene content of 1 ppm or less and an acetylene content of 1 ppm or less.

Further, the content of the low molecular weight carboxylic acids, the content of bromine ions, the contents of the metal impurities, the ethylene content, and the acetylene content in the high-purity hydrogen chloride gas at the column top of the volatile organic impurity-removed hydrochloric acid distillation column (14) were determined by multiplying the measured values by 100/35-fold, taking into account the hydrochloric acid concentration.

Example 4

High-purity hydrogen chloride gas and high-purity hydrochloric acid were both produced in the same manner as in Example 1, except that the distillation of the volatile organic impurity-removed hydrochloric acid in the [High-Purity Hydrogen Chloride Gas Generation Step] in Example 1 was performed changing the column top temperature of the volatile organic impurity-removed hydrochloric acid distillation column (14) to 105° C.

In the obtained high-purity hydrochloric acid, the content of the low molecular weight carboxylic acids was 3 ppm or less and the content of bromine ions was also 1 ppm or less. Furthermore, the metal impurities were found that each of sodium, magnesium, aluminum, calcium, iron, nickel, copper, potassium, zinc, silver, arsenic, barium, cadmium, cobalt, chromium, gallium, germanium, lithium, manganese, lead, tin, strontium, gold, beryllium, bismuth, mercury, molybdenum, niobium, tantalum, thallium, vanadium, zirconium, boron, antimony, titanium, silicon, and phosphorous was as low as 10 ppt or less. Note that the high-purity hydrochloric acid had an ethylene content of 1 ppm or less and an acetylene content of 1 ppm or less.

Further, the content of the low molecular weight carboxylic acids, the content of bromine ions, the contents of the metal impurities, the ethylene content, and the acetylene content in the high-purity hydrogen chloride gas at the column top of the volatile organic impurity-removed hydrochloric acid distillation column (14) were determined by multiplying the measured values by 100/35-fold, taking into account the hydrochloric acid concentration.

Comparative Example 1

High-purity hydrogen chloride gas and high-purity hydrochloric acid were both produced in the same manner as in Example 1, except that the distillation of the volatile organic impurity-removed hydrochloric acid in the [High-Purity Hydrogen Chloride Gas Generation Step] in Example 1 was performed changing the column top temperature of the volatile organic impurity-removed hydrochloric acid distillation column (14) to 110° C.

On the other hand, in the obtained high-purity hydrochloric acid, the content of the low molecular weight carboxylic acids was 5 ppm or less and the content of bromine ions was 2 ppm or less. Furthermore, the metal impurities were found that each of sodium, magnesium, aluminum, calcium, iron, nickel, copper, potassium, zinc, silver, arsenic, barium, cadmium, cobalt, chromium, gallium, germanium, lithium, manganese, lead, tin, strontium, gold, beryllium, bismuth, mercury, molybdenum, niobium, tantalum, thallium, vanadium, zirconium, boron, antimony, titanium, silicon, and phosphorous was as low as 10 ppt or less. Note that the high-purity hydrochloric acid had an ethylene content of 1 ppm or less and an acetylene content of 1 ppm or less.

Further, the content of the low molecular weight carboxylic acids, the content of bromine ions, the contents of the metal impurities, the ethylene content, and the acetylene content in the high-purity hydrogen chloride gas at the column top of the volatile organic impurity-removed hydrochloric acid distillation column (14) were determined by multiplying the measured values by 100/35-fold, taking into account the hydrochloric acid concentration.

Comparative Example 2

High-purity hydrogen chloride gas and high-purity hydrochloric acid were both produced in the same manner as in Example 1, except that the distillation of the volatile organic impurity-removed hydrochloric acid in the [High-Purity Hydrogen Chloride Gas Generation Step] in Example 1 was performed changing the column top temperature of the volatile organic impurity-removed hydrochloric acid distillation column (14) to 80° C.

In the obtained high-purity hydrochloric acid, the content of the low molecular weight carboxylic acids was 5 ppm or less and the content of bromine ions was 3 ppm or less. Furthermore, the metal impurities were found that each of sodium, magnesium, aluminum, calcium, iron, nickel, copper, potassium, zinc, silver, arsenic, barium, cadmium, cobalt, chromium, gallium, germanium, lithium, manganese, lead, tin, strontium, gold, beryllium, bismuth, mercury, molybdenum, niobium, tantalum, thallium, vanadium, zirconium, boron, antimony, titanium, silicon, and phosphorous was as low as 10 ppt or less. Note that the high-purity hydrochloric acid had an ethylene content of 1 ppm or less and an acetylene content of 1 ppm or less.

Further, the content of the low molecular weight carboxylic acids, the content of bromine ions, the contents of the metal impurities, the ethylene content, and the acetylene content in the high-purity hydrogen chloride gas at the column top of the volatile organic impurity-removed hydrochloric acid distillation column (14) were determined by multiplying the measured values by 100/35-fold, taking into account the hydrochloric acid concentration.

The results of the above Examples and Comparative Examples are shown in Table 1.

TABLE 1

|  | Column bottom temperature (° C.) | Column top temperature (° C.) | Low molecular weight carboxylic acids (ppm) | Bromine ion (ppm) | Ethylene (ppm) | Acetylene (ppm) |
| --- | --- | --- | --- | --- | --- | --- |
| Example 1 | 95 | 60 | 2 | 1 or less | 1 or less | 1 or less |
| Example 2 | 95 | 50 | 1 or less | 1 or less | 1 or less | 1 or less |
| Example 3 | 70 | 60 | 2 | 1 or less | 1 or less | 1 or less |
| Example 4 | 105 | 60 | 3 | 1 or less | 1 or less | 1 or less |
| Comparative Example 1 | 110 | 60 | 5 | 2 | 1 or less | 1 or less |
| Comparative Example 2 | 95 | 80 | 5 | 3 | 1 or less | 1 or less |

As shown in Table 1, the production method of the present invention can effectively remove the low molecular weight carboxylic acids such as formic acid, which is problematic in the case where the byproduct hydrogen chloride gas obtained from the thermal decomposition reaction of 1,2-dichloroethane is used as a raw material. In addition, bromine ions, ethylene, and acetylene can be effectively removed as well.

EXPLANATION OF REFERENCE SIGNS

1: byproduct hydrogen chloride gas supply piping
2: inert gas supply piping
3: byproduct hydrogen chloride gas absorption column
4a, 4b: pure water supply pipe
5: unrecovered gas absorption column
6: recovered hydrochloric acid supply pipe
7: discharge pipe of non-absorption gas to water
8: unrecovered gas discharge pipe
9: crude hydrochloric acid supply piping
10: crude hydrochloric acid dissipation column
11: volatile organic impurity discharge piping
12: inert gas supply piping
13: volatile organic impurity-removed hydrochloric acid supply piping
14: volatile organic impurity-removed hydrochloric acid distillation column
15: high-purity hydrogen chloride gas supply piping
16: column bottom liquid resupply piping
17: pure water supply pipe
18: high-purity hydrogen chloride gas absorption column
19: non-absorption gas discharge pipe to water
20: high-purity hydrochloric acid supply piping
21: particulate capturing filter
22: high-purity hydrochloric acid

The invention claimed is:
1. A method for producing a high-purity hydrogen chloride gas, comprising performing a purification process that includes the following 1) to 3) by using, as a raw material, a byproduct hydrogen chloride gas generated when producing vinyl chloride by thermally decomposing 1,2-dichloroethane:

1) generating a crude hydrochloric acid by allowing water to absorb the byproduct hydrogen chloride gas;
2) generating a volatile organic impurity-removed hydrochloric acid by bringing the crude hydrochloric acid obtained in 1) into contact with an inert gas supplied from a supply pipe, at a liquid temperature of 20 to 45° C. to dissipate volatile organic impurities; and
3) generating a high-purity hydrogen chloride gas by supplying the volatile organic impurity-removed hydrochloric acid obtained in 2) to a distillation column and performing distillation under conditions of a column bottom temperature of higher than 60° C. and 108° C. or lower and a column top temperature of 60° C. or lower to distill out a high-purity hydrogen chloride gas.

2. The method for producing a high-purity hydrogen chloride gas according to claim 1, wherein a content of low molecular weight carboxylic acids consisting of formic acid and acetic acid in the crude hydrochloric acid obtained in 1) is 3 ppm or more.

3. The method for producing a high-purity hydrogen chloride gas according to claim 1, wherein a content of bromine ion in the crude hydrochloric acid obtained in 1) is 5 ppm or more.

4. The method for producing a high-purity hydrogen chloride gas according to claim 1, wherein 1,2-dichloroethane includes one obtained by an oxychlorination reaction using ethylene, hydrogen chloride, and oxygen as raw materials.

5. The method for producing a high-purity hydrogen chloride gas according to claim 1, wherein, in 3), a column bottom liquid after distilling out the hydrogen chloride gas from the volatile organic impurity-removed hydrochloric acid is circulated to the crude hydrochloric acid of 1).

6. The method for producing a high-purity hydrogen chloride gas according to claim 1, wherein the high-purity hydrogen chloride gas is for semiconductor manufacturing.

7. A method for producing a high-purity hydrochloric acid, comprising after performing the method for producing a high-purity hydrogen chloride gas according to claim 1:

4) generating a high-purity hydrochloric acid by allowing water to absorb the obtained high-purity hydrogen chloride gas.

8. The method for producing a high-purity hydrochloric acid according to claim 7, further comprising:

5) Removing a particle by treating the high-purity hydrochloric acid obtained in the step 4) with a particulate capturing filter.

9. The method for producing a high-purity hydrochloric acid according to claim 7, wherein a content of low molecular weight carboxylic acids consisting of formic acid and acetic acid in the resulting high-purity hydrochloric acid is 1 ppm or less.

10. The method for producing a high-purity hydrochloric acid according to claim 7, wherein a content of bromine ion in the resulting high-purity hydrochloric acid is 1 ppm or less.

11. The method for producing a high-purity hydrochloric acid according to claim 7, wherein the high-purity hydrochloric acid is for semiconductor manufacturing.

12. The method for producing a high-purity hydrochloric acid according to claim 1, wherein in 2), the volatile organic impurities are dissipated by counterflow contact in which the hydrochloric acid is distributed from an upper side to a lower side and the inert gas is distributed from a lower side to an upper side.

* * * * *